(12) United States Patent
Peloso et al.

(10) Patent No.: US 7,689,121 B2
(45) Date of Patent: Mar. 30, 2010

(54) METHOD AND DEVICE FOR SURVEILLANCE OF OPTICAL CONNECTION PATHS FOR A TRANSPARENT OPTICAL NETWORK

(75) Inventors: Pierre Peloso, Marcoussis (FR); Emmanuel Dotaro, Verrieres le Buisson (FR)

(73) Assignee: Alcatel Lucent, Paris (FR)

( * ) Notice: Subject to any disclaimer, the term of this patent is extended or adjusted under 35 U.S.C. 154(b) by 490 days.

(21) Appl. No.: 11/775,677

(22) Filed: Jul. 10, 2007

(65) Prior Publication Data

US 2008/0013947 A1 Jan. 17, 2008

(30) Foreign Application Priority Data

Jul. 11, 2006 (FR) .................................. 06 52905

(51) Int. Cl.
*H04B 10/08* (2006.01)
*H04J 14/00* (2006.01)
(52) U.S. Cl. .............................. 398/58; 398/33; 398/57
(58) Field of Classification Search ................. 398/2–5, 398/17–19, 25, 57, 58, 33
See application file for complete search history.

(56) References Cited

U.S. PATENT DOCUMENTS 5,282,270 A 1/1994 Oppenheimer et al.
6,671,256 B1 * 12/2003 Xiong et al. ................. 370/230
2002/0131114 A1 9/2002 Yoo
2003/0043427 A1 * 3/2003 Robidas et al. .............. 359/110
2003/0099010 A1 5/2003 Liu et al.

FOREIGN PATENT DOCUMENTS

EP 1347591 A2 9/2003
GB 2301991 A 12/1996

* cited by examiner

*Primary Examiner*—Dalzid Singh
(74) *Attorney, Agent, or Firm*—Carmen Patti Law Group, LLC

(57) ABSTRACT

An optical connection path surveillance device for a transparent optical network includes analysis means (80, 81) adapted to detect node signatures carried by an optical signal in transit at a point of said network, each node signature including information uniquely associated with a switching node of the network. The analysis means include calculation means (81) adapted to determine a number of hops from said detected node signatures and error detection means (81) adapted to compare said number of hops to a predetermined threshold in order to detect a routing error in relation to said optical signal if said threshold is exceeded. In one embodiment, a surveillance device detects looped paths on the basis of the detected node signatures.

17 Claims, 6 Drawing Sheets

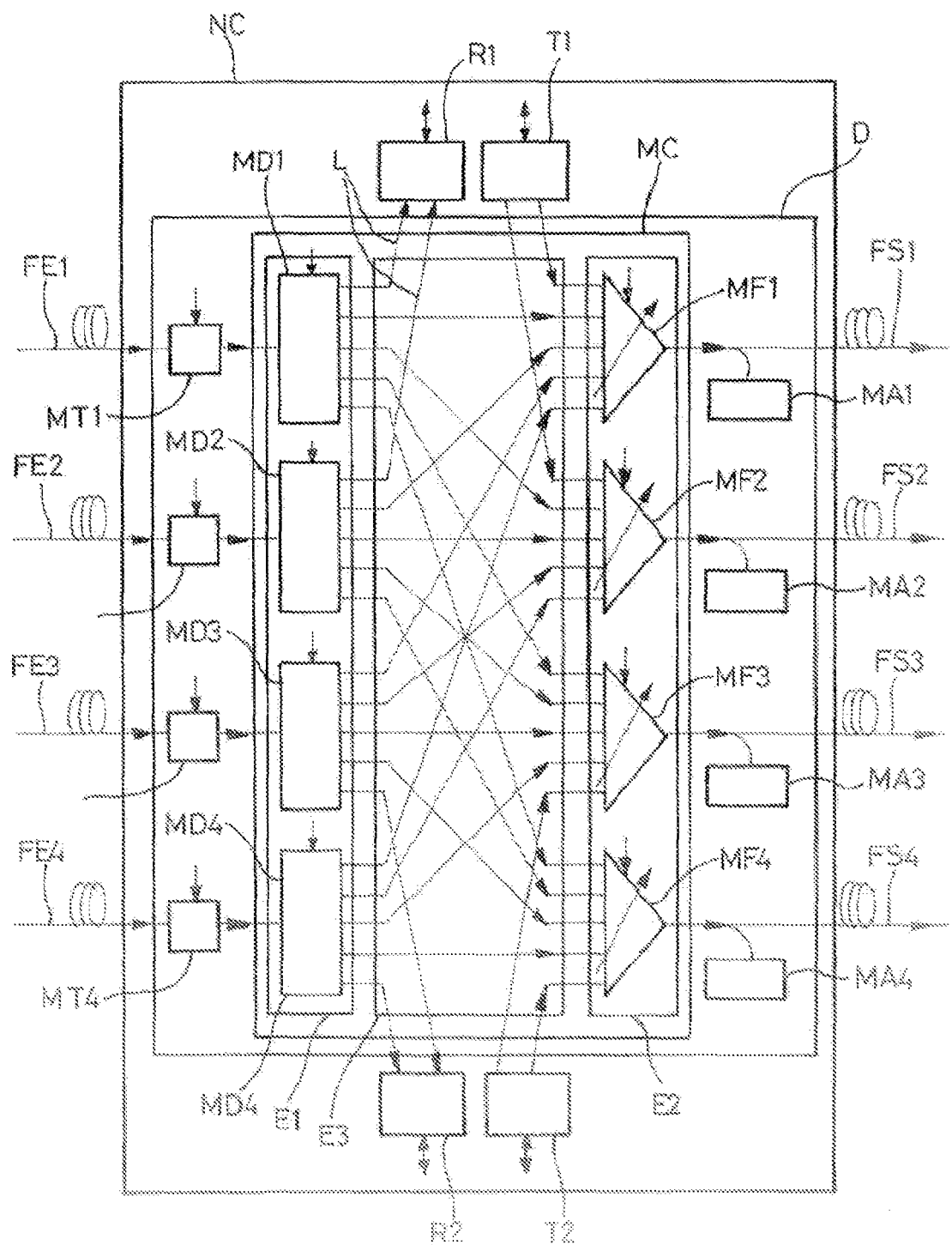

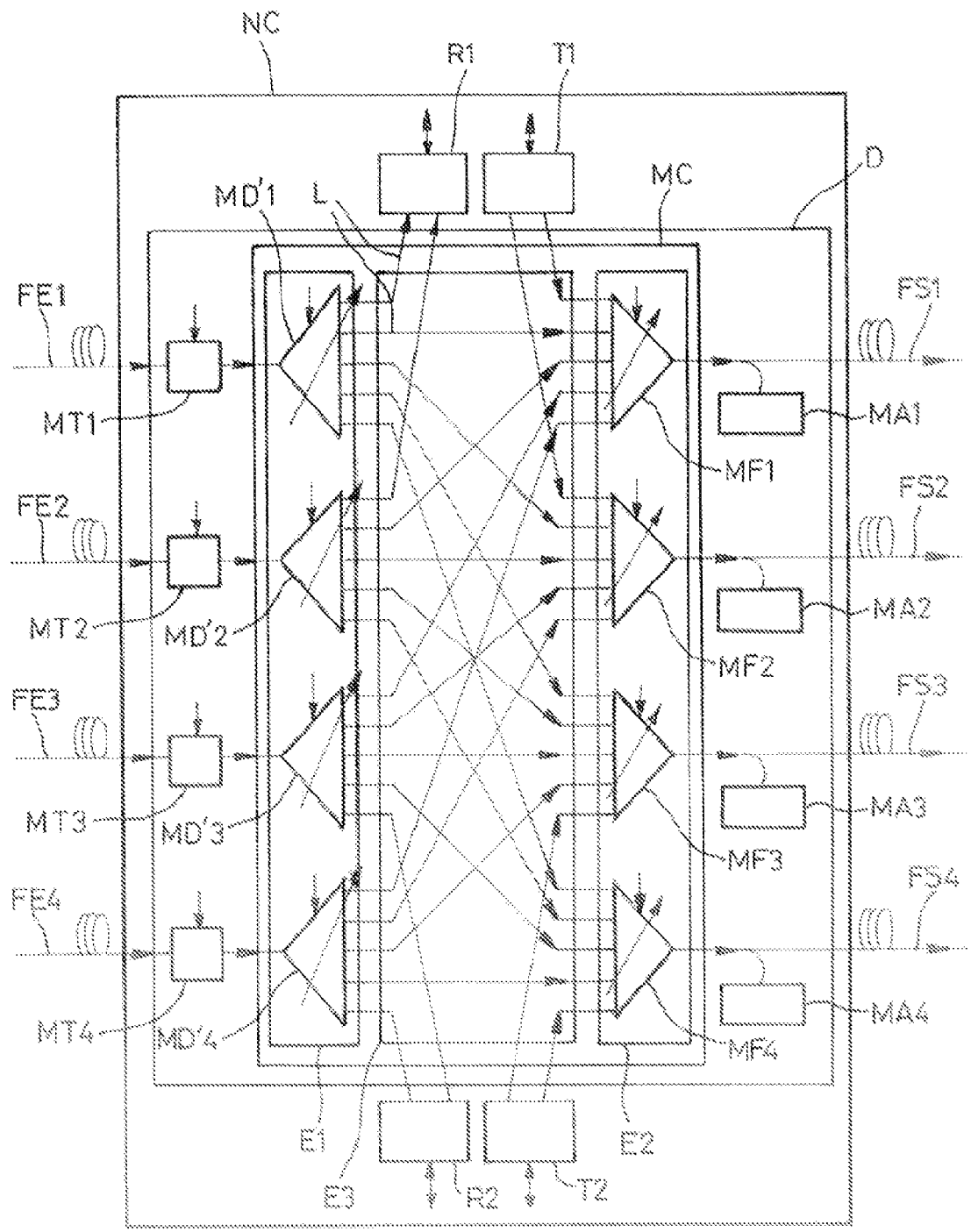
FIG_2

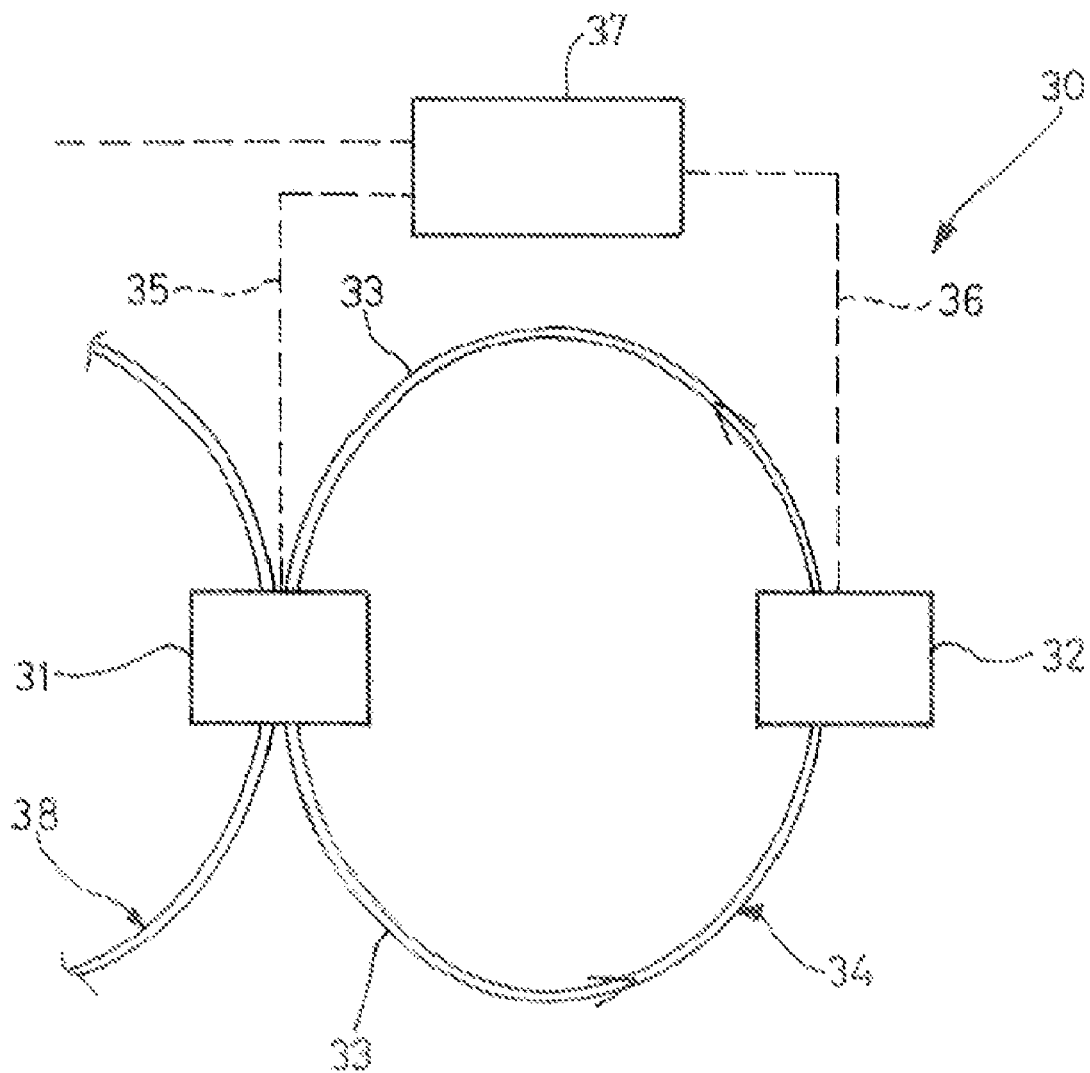
FIG_3

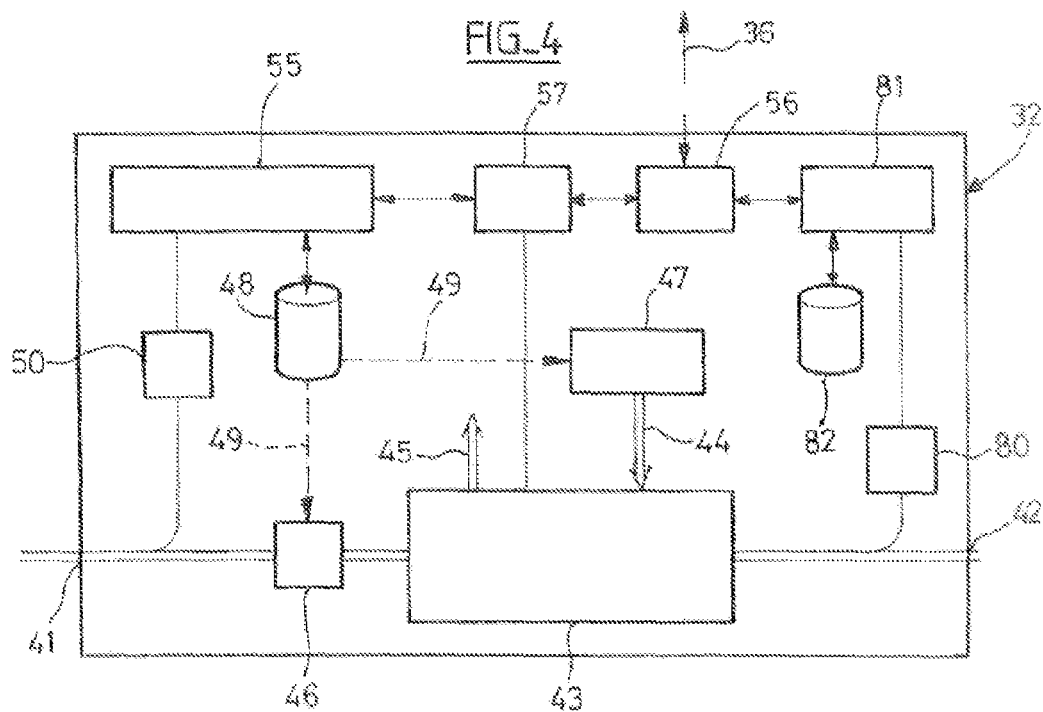
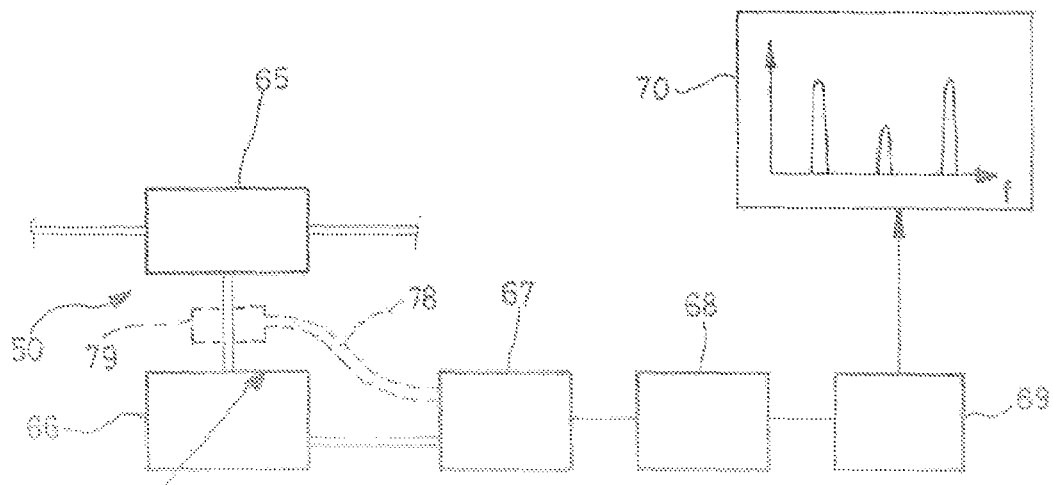

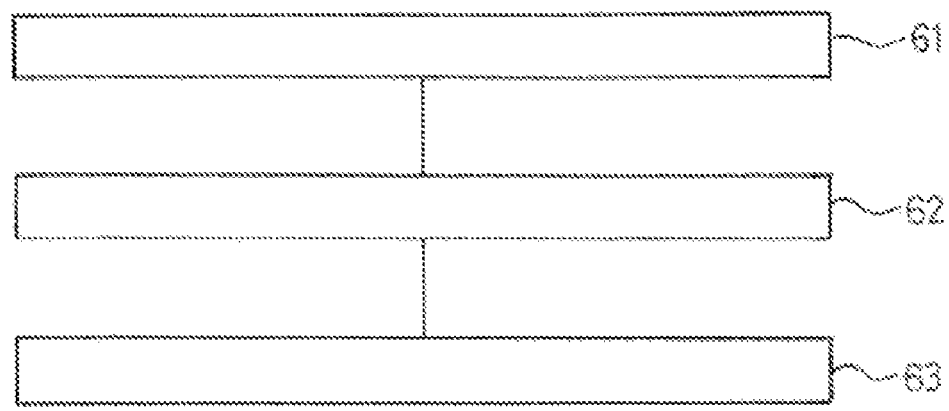
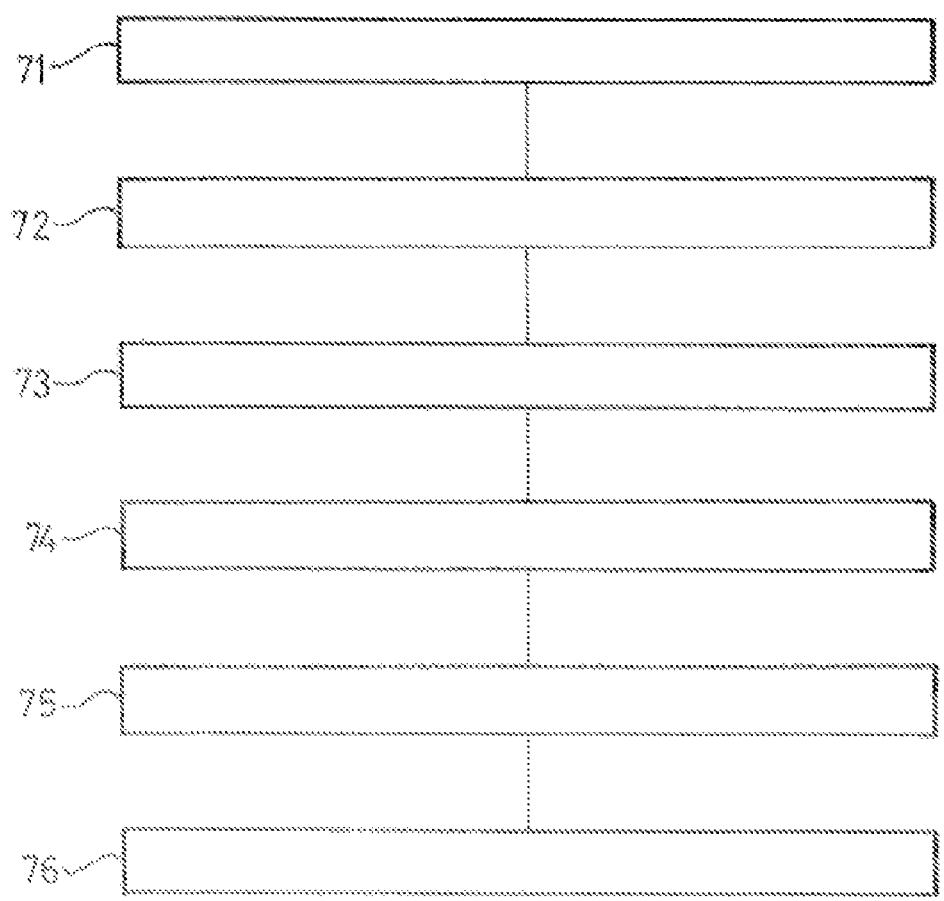

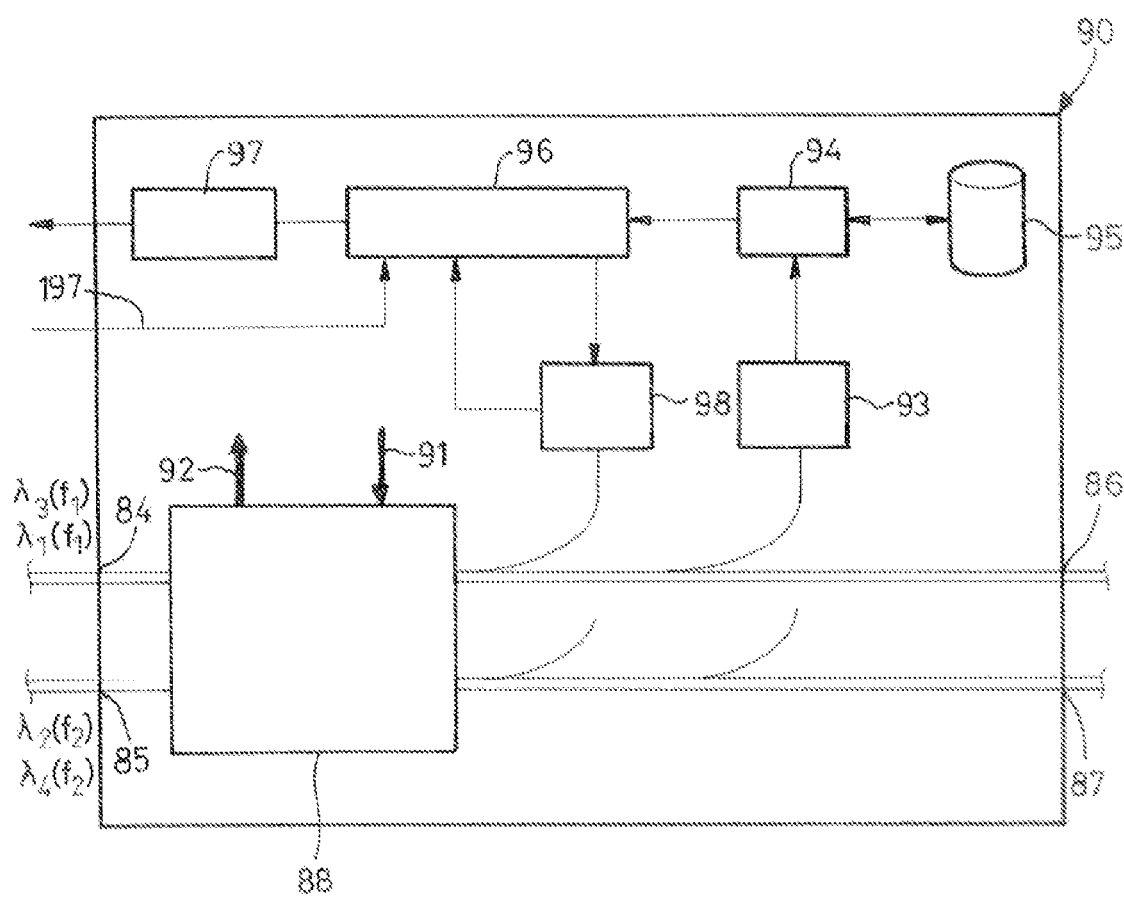
FIG_8
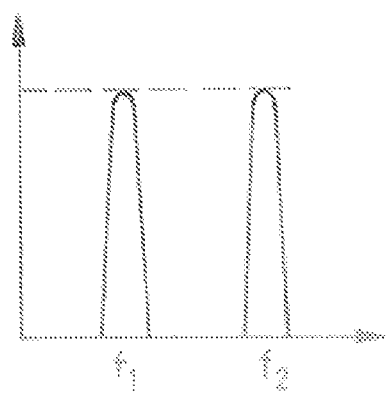
FIG_9
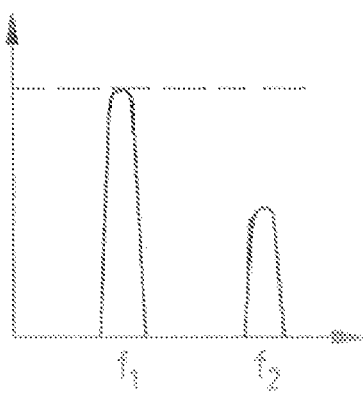
FIG_10

METHOD AND DEVICE FOR SURVEILLANCE OF OPTICAL CONNECTION PATHS FOR A TRANSPARENT OPTICAL NETWORK

The invention concerns transparent optical networks, and more precisely the tracking of optical connection paths set up within such networks via their switching nodes.

Here "optical connection path" means a physical path or route taken by one or more optical signals sent at one or more given wavelengths within a transparent optical network. A physical path of this kind is defined by optical line portions generally consisting of optical fibers and connecting pairs of transparent communication nodes.

Moreover, here "transparent optical network" means a network in which the signals remain in the optical domain at all times.

Furthermore, here "transparent switching node" means a network equipment including at least one optical switching device, of transparent type, responsible for switching channels with multiplexed wavelengths or wavelengths to be multiplexed coming from upstream optical lines and intended for downstream optical lines.

Additionally, here "multiplex" means a set of channels with different wavelengths conjointly utilizing the same medium. Channels associated with different wavelengths and conjointly utilizing the same medium can therefore be multiplexed to constitute a multiplex. An optical connection path can thus be associated with a wavelength channel or a wavelength multiplex, in particular a wavelength multiplex forming the same connection, i.e. treated as a single logical entity. To facilitate traffic engineering, a plurality of wavelength channels having different sources and/or destinations can be aggregated on a common portion of their respective physical routes in order to be treated as a single connection on that common portion.

As the person skilled in the art knows, it is particularly important for operators to know if the optical connection paths that are set up between the switching nodes of their transparent optical networks are suited to the respective programming states of the optical switching devices of those switching nodes. Any unsuitability results from a problem with programming, with the operation of a switching node or in an optical line portion, which problem must be solved.

In order to verify the suitability referred to above, networks employ methods known as "optical connection path tracking and verification". This verification therefore verifies the connectivity of an optical connection path, i.e. if the channel connects the correct source to the correct destination. In a non-transparent optical network, this is relatively easy because there are effected in the switching nodes optical/electrical/optical type signal conversions which, through the addition of control traffic, verify that each receiver is connected to the corresponding source on each connection.

This is not the case in a transparent optical network because of the absence of optical/electrical/optical type signal conversion (the optical switching devices function in the physical layer, and more precisely on the wavelengths of the channels).

Several solutions to this problem have been proposed.

A first solution, which is an extrapolation of what happens in a non-transparent network, consists in injecting control traffic into the optical lines in order to test the match between the source and the destination of the various optical connection paths. This solution has the major drawback of consuming bandwidth and of not delivering any information as to the location of any error, which makes repair more difficult.

A second solution consists in associating with each signal source (and therefore each channel) used in the network at least one frequency that is applied to the channel by overmodulation. Analyzing a wavelength at a selected location of the network determines the overmodulation frequency or frequencies applied to find out which channel is present thanks to information supplied by the network manager. This information consists at least of the correspondence between the overmodulation frequencies and the channels, so that the path taken by this channel can be determined. This solution is proposed by the company Tropics in particular, under the product name "Wavelength Tracker®".

This second solution necessitates the use of as many processing modules, for example of the variable optical attenuator (VOA) type, as there are channels used in the network. The variable optical attenuators are placed on the upstream side of each add port of an optical switching device to overmodulate the channels to be added to the traffic. This leads to high costs and causes problems when a network of a certain size is to be transformed into a network of larger size (this is known as "scalability") because of new overmodulation frequencies that must be used to be applied to the new channels.

US 2003/0099010 proposes a system for surveillance of the performance of a wavelength-division multiplex optical network in which each node includes an encoder for modulating the optical signals leaving the node using a signature of the optical fiber in which these optical signals enter. This system measures the power of the signal associated with each signature in order to detect a break in a fiber, an amplifier failure or a transponder failure. To evaluate which channels are passing in transit through which fibers, it teaches monitoring conjointly the presence of the fiber signatures and the channel signatures at various points of the network.

EP 1 347 591 proposes a fault detection system for a wavelength-division multiplexing optical network, in which the verification devices detect the presence of signatures assigned in a unique manner to network elements. To detect the failure of a link or a network element, the system processes the information detected by the verification devices in relation to a correct image of the network. The correct image of the network is created and updated by a network manager.

An object of the invention is to propose methods and devices for detecting other types of errors in a transparent optical network, in particular routing errors affecting wavelength channels, configuration errors at the network management plane level, and errors that can have hardware or human causes. Another object of the invention is to propose methods and devices for quickly and economically detecting errors in a transparent optical network.

To this end, a first aspect of the invention provides an optical connection path surveillance method for a transparent optical network in which each of a plurality of switching nodes is respectively adapted to pass an optical signal transparently from a link on the upstream side of said switching node to a link on the downstream side of said switching node and to mark said optical signal with a node signature including information uniquely associated with said switching node, said method including the step of detecting the node signatures with which an optical signal in transit at a point of said network is marked, which method is characterized by the steps of:

determining a number of hops from said detected node signatures, and comparing said number of hops to a predetermined threshold to detect a routing error relating to said optical signal if said threshold is exceeded.

Thanks to a method of this kind, the node signatures can be used to obtain functions analogous to those provided by the time to live (TTL) parameter of an IP (Internet Protocol) packet. For example, this method can detect that an optical signal has lost its way in the network or that an optical signal is at risk of reaching a network sector to which it is foreign and/or could thus run the risk of being delivered to a client for which it is not intended. This detection enables local corrective measures to be taken at the switching node and/or a network management system to be alerted in order to take corrective measures at other points of the network. For example, the number of hops can be determined as a number of different node signatures marking the optical signal or as a number of different communication nodes represented by the detected signatures.

The predetermined threshold can be fixed as a function of the topology of the network, for example as a function of a diameter of the network expressed as a number of hops. The topology of an optical network generally does not evolve frequently, with the result that this threshold will not need to be updated frequently. Error detection is therefore essentially local and necessitates no intensive interaction with a network manager having a knowledge of the whole of the network.

This method can be implemented at any point of the network. The signatures carried by an optical signal received by a switching node of said network are preferably detected.

A particular embodiment of the method includes the step of terminating or extracting from the network said optical signal for which said routing error is detected. For example, this extraction or termination can be effected at a switching node adjacent the point of the network at which the error is detected or at a switching node at which the detection is effected.

The signatures carried by an optical signal having only one wavelength are preferably detected. An alternative embodiment detects signatures carried by an optical signal including a plurality of wavelengths that belong to the same connection, i.e. that are switched together in the network and therefore take a common path through the same ports and the same connections. For example, in this embodiment the wavelengths belong to a band of wavelengths that are all switched together in the network.

In all cases, a step may be provided of separating one or more channels of a multiplex of wavelengths in transit in the network to obtain the optical signal whose signatures must be detected.

The invention also provides an optical connection path surveillance device for a transparent optical network, including: analysis means adapted to detect node signatures carried by an optical signal in transit at a point of said network, each node signature including information uniquely associated with a switching node of said network, characterized by the fact that said analysis means include calculation means adapted to determine a number of hops from said detected node signatures and error detection means adapted to compare said number of hops to a predetermined threshold to detect a routing error relating to said optical signal if said threshold is exceeded.

The calculation means preferably determine the number of hops as a number of detected separate node signatures. This embodiment suits a network in which only one signature is assigned for each node, for example.

In one particular embodiment, the device includes a directory of signatures identifying a plurality of node signatures and the respective switching node associated with each of them, said calculation means being adapted to cooperate with said directory of signatures to determine said number of hops. In this way, the calculation means can identify the node signatures among other signatures and/or take account of node specifics, for example the fact that a node marks an optical signal crossing it with a plurality of signatures. Here "directory of signatures" means reference information that identifies the associations between the node signatures and the nodes. This information is made available to the calculation means, for example in the form of a table or some other form.

The device advantageously includes alarm means adapted to produce an alarm signal relating to said optical signal for which said routing error is detected. For example, the alarm signal can be produced for a network management system. Here "network management system" means a centralized system connected to the switching nodes of the network or a distributed system including, for example, a plurality of management modules distributed between a plurality of switching nodes of the network.

In one particular embodiment, the device is associated with a switching node in which said optical signal is received, said device including control means adapted to command a switching device of said switching node to terminate or extract said optical signal for which said routing error is detected.

The analysis means advantageously include an optical filtering module for separating one or more channels of a multiplex of wavelengths in transit in the network and for supplying said wavelength channel or channels, in particular a plurality of channels belonging to the same connection, by way of an optical signal the signatures whereof must be detected. For example, the optical filtering module includes a channel demultiplexer, a band demultiplexer or a tunable filter.

A second aspect of the invention provides an optical connection path surveillance device for a switching node of a transparent optical network, said switching node including processing means adapted to mark an optical signal with at least one node signature including information uniquely associated with said switching node, at least one optical output adapted to transmit said marked optical signal into said network, at least one optical input adapted to be coupled to an upstream optical line, and switching means coupling at least one of said inputs to at least one of said outputs, said optical connection path surveillance device including analysis means adapted to analyze an optical signal received by said switching node on the upstream side of said processing means to detect one or more signatures with which said optical signal is marked, characterized by the fact that: said analysis means are adapted to search for said at least one node signature associated with said switching node to detect a routing error if said received optical signal is marked by a node signature associated with said switching node on the upstream side of said processing means.

When there is only one node signature associated with the node, the analysis means are adapted to detect if that signature is present in the optical signal. When there is a plurality of node signatures associated with the node, the analysis means are preferably adapted to detect if any of those signatures is present. It is therefore possible to detect the presence of an optical signal that passes through the switching node twice on taking a looped route in the network. This detection enables local corrective measures to be taken at the switching node and/or a network management system to be alerted in order to take corrective measures at other points of the network. Here again, error detection is essentially local and necessitates no prior interaction with a network manager having a knowledge of the whole of the network.

The device advantageously includes alarm means adapted to produce an alarm signal relating to said optical signal for which said routing error is detected. For example, the alarm signal can be produced for a network management system. Here "network management system" means a centralized system connected to the switching nodes of the network, or a distributed system, for example including a plurality of management modules distributed between a plurality of switching nodes of the network.

In one particular embodiment, the device is associated with a switching node in which said optical signal is received, said device including control means adapted to command a switching device of said switching node to terminate or extract said optical signal for which said routing error is detected.

The analysis means are preferably adapted to search for said at least one node signature in an optical signal having only one wavelength.

According to another embodiment, the analysis means are adapted to search for said at least one node signature in a multiplex of wavelengths.

The analysis means advantageously include an analysis module adapted to function selectively in a single-channel mode of operation in which said at least one node signature is searched for in an optical signal having only one wavelength and in a multichannel mode of operation in which said at least one node signature is searched for in a multiplex of wavelengths.

The analysis means preferably cooperate with storage means, for example a memory, which stores the signature or the plurality of signatures associated with the switching node.

According to the invention, the optical connection path surveillance devices referred to hereinabove and hereinafter can be combined with an optical switching device for a switching node of a transparent optical network comprising, firstly, at least one input port adapted to be coupled by an upstream optical line dedicated to transporting multiplexed channels, secondly, at least one output (an output port adapted to be coupled to a downstream optical line dedicated to transporting multiplexed channels or a drop port), and, thirdly, switching means coupling each input port to each output.

This optical switching device is characterized in that it further includes processing means responsible for adding to the channels that reach each input port of a switching node a signature including first information representing at least that switching node.

Here "signature" means any modification applied to a channel or multiplex for marking the passage of that channel or of the channels constituting that multiplex at a given location.

The optical switching device can have other features and in particular, separately or in combination:
- its processing means can be responsible for adding to one channel or to each channel (or one channel or each channel of one multiplex or each multiplex) a signature including first information representing their own switching node and second information representing the input port that received the channel;
- its processing means can be responsible for applying the same amplitude overmodulation at a chosen frequency (forming first information), representing their own switching node, to one channel or each channel (or one channel or each channel of one multiplex or each multiplex) received by each input port;
- its processing means can be responsible, for example, for applying to the first information (where applicable to the overmodulation) applied to the channels received by different input (and add) ports amplitude overmodulation at different frequencies or with different relative phases (forming second information) respectively representing those input (or add) ports; the ports can be identified by an FSK code by modulating the overmodulation frequency, for example;
- its processing means can include a number of processing modules at least equal to the number of input ports and each responsible for adding the signature to the channels received by the corresponding input port;
- its processing means can include at least one additional processing module responsible for adding the signal to the channels introduced by an add port coupled to an add module;
- its processing means can include a number of additional processing modules equal to the number of add ports and each responsible for adding the signature to the channels introduced by the corresponding add port;
- each processing module can take the form of an electrically controlled variable optical attenuator, for example;
- it can equally include analysis means responsible for analyzing the channels that are delivered by one or at least some of the outputs, in order to determine the signature that has been added to them by the processing means of their own switching node;
- these analysis means can be responsible for determining a physical state of the switching device on the basis of the determination of the channels delivered by an output and the signature that has been added to each of said channels by said processing means of the switching device, for verifying a correspondence between said physical state of the switching device and a programming state defining the channels that must be delivered to said output and the input ports at which said channels must reach said switching device, and for generating an alarm message in the case of no correspondence;
- these analysis means can be responsible for analyzing the channels that are delivered by the outputs, in order to determine each signature that has been added to them by the processing means of each switching node through which they have passed in transit, including their own;
- these analysis means can be responsible for analyzing second information added to first information of a channel or each channel by the processing means of each switching node through which it has passed in transit, including their own;
- these analysis means can include a number of analysis modules equal to the number of output channels to be analyzed, for example, and each responsible for analyzing one or more channels received by the corresponding output;
- alternatively, a switch can be provided comprising inputs coupled to respective outputs to be analyzed and at least one output, and analysis means including a pooled analysis module including an input coupled to the output of the switch and responsible for analyzing one or more channels received by one of the outputs to be analyzed, selected by the switch;
- each analysis module can comprise an optical filtering sub-module responsible for separating one or more channels delivered by the corresponding output, for example, and at least one optical/electrical conversion sub-module responsible for converting each channel into an electrical signal, and an electrical analysis sub-module responsible for identifying each signature added to each separate channel;
- its processing means can be responsible for applying a signature to all the channels of a multiplex simultaneously;

its switching means can comprise, firstly, a first stage including N broadcast modules each having a first input, coupled to one of the input ports, and M first outputs, each adapted to deliver at least one of the multiplexed channels received by the first input, secondly, a second stage including M merging modules each having N second inputs, each adapted to receive at least one wavelength channel, and a second output coupled to an output port constituting one of the outputs and adapted to deliver at least one channel received at one of the second inputs, and, thirdly, a third stage including at least N×M optical links coupling at least the first outputs to the second inputs so that each of the N broadcast modules is coupled to each of the M merging modules;

for example, these broadcast modules can be chosen from optical couplers with one input and M outputs and wavelength selection modules, for example of the WSS type;

for example, these merging modules can be chosen from optical couplers with N inputs and one output and wavelength selection modules, for example of the WSS type. It will be noted that either the function modules are of the non-selective type and the broadcast modules of the selective type or the merging modules are of the selective type and the broadcast modules of the non-selective or selective type.

A third aspect of the invention provides an optical connection path surveillance method, for a transparent optical network, characterized by the steps of:

in at least one element of the network, marking an optical signal in transit in said element of the network with a transit point signature uniquely associated with said element of the network, detecting the transit point signatures carried by a multiplex of wavelengths in transit in an element of the network, searching the detected transit point signatures for an abnormal state affecting said multiplex of wavelengths, in response to the detection of the abnormal state affecting said multiplex of wavelengths, separating a subset of wavelengths of said multiplex of wavelengths and searching for a connection fault affecting said subset of wavelengths.

Here network element refers to any hardware element, simple or complex, localized or extended, having a defined location in the network and adapted to pass transparently or to emit an optical signal into the network, for example a switching node, an input port, an output port, an add port, a drop port, an optical link such as a waveguide or an optical fiber, the source of a monochromatic optical signal, the source of a wavelength division multiplexed optical signal, etc.

In the case of the transit point signatures uniquely associated with respective elements of the network, the same signature can be carried by a plurality of wavelength channels, for example if the transit point signatures are marked on multiplexes. As indicated hereinabove, prior demultiplexing of the wavelengths is generally necessary for identifying a routing anomaly affecting one or more wavelength channels, for example with the aid of transit point signatures carried by that channel or group of channels. Now, the simultaneous detection of the signatures carried by each wavelength channel individually would necessitate a large number of detection devices, i.e. the same number as there are channels, which would represent a disadvantageous hardware cost and overall size. Alternatively, the successive detection of the signatures carried by each wavelength channel by a single tunable detection device necessitates a long time. A basic idea of this aspect of the invention is that there exist situations in which a routing anomaly is detectable, at least partially, with the aid of the transit point signatures carried by the multiplex of wavelengths in its entirety. Accordingly, without requiring a large number of signature detection devices, it is nevertheless possible to obtain quickly an indication of a routing anomaly affecting at least certain channels of the spectral multiplex in these cases, for example in order to generate an alarm quickly, or to prepare or execute corrective actions, for example activation of a protection path or a protection component for the optical signal concerned. These alarm, preparation or protection measures can be effected while a more refined characterization of the anomaly is being effected, necessitating successive processing of a plurality of portions of the spectrum of channels. A subset of wavelengths can in each instance include a single wavelength channel or a plurality of wavelength channels, for example a spectral band. Moreover, the nature of the abnormal state detected can be used as an indication of the type of fault to be searched for in respect of the subset of wavelengths.

In a first embodiment, the transit point signatures carried by said multiplex of wavelengths are detected at successive times, the search for said abnormal state including the step of detecting a variation over time of the detected transit point signatures. An advantage of this embodiment is being able to trigger an alarm quickly in the case of variation of the connection paths under surveillance.

Said abnormal state preferably includes a variation of the transit point signatures decorrelated from the programming of the optical connection paths in the network, the search for said abnormal state including the step of searching the programming of the optical connection paths of the network for a reconfiguration instruction corresponding to the variation that has been detected. For example, in this case, the fault searched for in respect of one or each subset of wavelengths can be of the same kind as the abnormal state referred to above, for example a variation of the signatures of the subset of wavelengths or the appearance or the disappearance of a wavelength channel at the measurement point. The fault searched for can also be the presence of a switching state that does not match the programming of the network. Conversely, if a reconfiguration instruction is detected corresponding to the variation of the signatures, the abnormal state or the corresponding fault is not detected. In this case, the method could be used to confirm the correct execution in the data plane of a reconfiguration instruction received by the control plane of the network and to send a confirmation signal to a management system of the network where appropriate.

In a second embodiment, the transit point signatures are detected for an optical signal guided in the direction of processing means adapted to mark said optical signal with at least one transit point signature assigned to said processing means, said abnormal state including the presence, in said optical signal on the upstream side of said processing means, of a transit point signature assigned to said processing means. This embodiment detects the presence of a looped connection path. In this case, the fault searched for in respect of one or each subset of wavelengths can be of the same kind as the abnormal state mentioned above, namely the presence of a looped connection path for said set of wavelengths.

The method advantageously includes steps of selecting another subset of wavelengths in said multiplex of wavelengths and searching for a fault affecting said other subset of wavelengths. For example, the steps of selecting a subset of wavelengths and searching for a fault are repeated in time so as to be applied to all the wavelength channels of said multiplex of wavelengths. Alternatively, these steps can be repeated until a fault causing said abnormal state is detected in relation to a subset of wavelengths.

The method advantageously includes step of detecting the transit point signatures carried by said or each separate subset of wavelengths, the fault search being effected on the basis of the transit point signatures detected in said subset of wavelengths.

A transit point signature is preferably marked by amplitude overmodulation of the optical signal, the detection of the transit point signatures including a step of measuring a spectrum of the amplitude overmodulation carried by the optical signal. This spectrum can be measured for a predetermined set of frequencies, for example a predetermined range of frequencies, chosen as a function of the frequencies used in the network. If other types of signatures are employed, the analysis means are adapted accordingly.

The method advantageously includes a step of sending an alarm signal to a management system of the network in response to the detection of the abnormal state affecting said multiplex of wavelengths.

This third aspect of the invention also proposes an optical connection path surveillance device for a transparent optical network including processing means in at least one element of the network adapted to mark an optical signal in transit in said element of the network with a transit point signature uniquely associated with said element of the network, characterized in that said device includes:

multichannel analysis means in an element of the network for detecting the transit point signatures carried by a multiplex of wavelengths in transit in said network element, said multichannel analysis means being adapted to search for an abnormal state affecting said multiplex of wavelengths on the basis of the detected transit point signatures, optical separation means for separating a subset of wavelengths of said multiplex of wavelengths, separate channel analysis means adapted to search for a fault affecting said separate subset of wavelengths.

Triggering means are advantageously adapted to trigger said separate channel analysis means to effect said fault search in response to the detection of the abnormal state affecting said multiplex of wavelengths.

In one particular embodiment, the multichannel analysis means include temporal comparison means for detecting a variation over time of the detected transit point signatures.

Instruction analysis means are preferably adapted to search the programming of the optical connection paths of the network for a reconfiguration instruction corresponding to a variation of the transit point signatures detected by said temporal comparison means.

In another particular embodiment, the multichannel analysis means and said separate channel analysis means are adapted to detect signatures in an optical signal propagating toward processing means adapted to mark said optical signal with at least one transit point signature assigned to said processing means, said multichannel analysis means and said separate channel analysis means being adapted to search said at least one transit point signature assigned to said processing means.

The invention also proposes a switching node for a (D)WDM network equipped with an optical connection path surveillance device as described hereinabove. Such a switching node can for example take the form of a transparent optical cross-connect or a reconfigurable optical add/drop multiplexer.

Other features and advantages of the invention will become apparent on reading the following detailed description and examining the appended drawings, in which:

FIG. 1 is a functional diagram of a first embodiment of an optical switching device in which different embodiments of the surveillance devices can be installed, FIG. 2 is a functional diagram of a second embodiment of an optical switching device in which different embodiments of the surveillance devices can be installed, FIG. 3 is a functional diagram of a transparent optical network in which optical path surveillance devices are installed, FIG. 4 is a functional diagram of an optical switching node of the FIG. 3 network, FIG. 5 is a functional diagram of an analysis module of the FIG. 4 surveillance device, FIG. 6 is a flowchart illustrating a first surveillance method implemented by the FIG. 4 surveillance device, FIG. 7 is a flowchart illustrating a second surveillance method implemented by the FIG. 4 surveillance device, FIG. 8 is a functional diagram of an optical switching node equipped with another embodiment of a surveillance device, and FIGS. 9 and 10 represent spectra of signatures measured by the FIG. 8 surveillance device.

The appended drawings constitute part of the description of the invention as well as contributing to the definition of the invention, if necessary.

It is considered hereinafter by way of nonlimiting example that the switching nodes are transparent optical cross-connects (OXC), where appropriate with an add and/or drop function, or optical add/drop multiplexers (OADM). More generally, switching means refers here to means capable of selectively allowing to pass or not to pass between an input and an output an optical signal having one or more chosen wavelengths.

FIGS. 1 and 2 represent one embodiment of a switching node NC adapted to pass an optical signal transparently from a link on the upstream side of said switching to a link on the downstream side of said switching node and to mark said optical signal with a node signature including information uniquely associated with the switching node NC.

The switching node NC includes a switching device D which has N input ports coupled to respective optical input lines FEi (i=1 to N), for example optical fibers, in which "circulate" multiplexed channels, also called optical signal spectral multiplexes or wavelength multiplexes. In the examples shown in FIGS. 1 and 2, the suffix i takes values from 1 to 4, because (by way of illustrative example) N is equal to 4. However, this suffix i is not limited to these values set by the number N of input ports of the switching device D. It can take any value from 1 to N, where N is greater than or equal to 1 ($N \geq 1$).

For example, each input optical fiber FEi is capable of transporting R optical channels ($R>0$).

The switching device D also has M output ports coupled to respective output optical lines FSj (j=1 to M), for example optical fibers, in which "circulate" multiplexed channels also called optical signal spectral multiplexes. In the examples shown in FIGS. 1 and 2, the suffix j takes values from 1 to 4, because (by way of illustrative example) M is equal to 4. However, this suffix j is not limited to these values that are set by the number M of output ports of the switching device D. It can take any value from 1 to M, where M is greater than or equal to 1 ($M \geq 1$).

It is important to note that the M output ports constitute M outputs. However, the device can have one or more other outputs each defining a drop port (see below). Consequently, here output means either an output port coupled to an output optical line FSj or a drop port.

The switching device D also includes a switching module MC that can be functionally broken down into first, second and third stages E1, E2 and E3. Any type of switching module MC can be envisaged, not only that about to be described with reference to FIGS. 1 and 2.

The first stage E1 (shown in FIGS. 1 and 2) includes N broadcast modules MDi (i=1 to N) each having at least one first input and M first outputs. As indicated hereinabove, in the examples shown in FIGS. 1 and 2, N and M are equal to 4 (N=4, M=4) but, like M, N can take any value greater than or equal to 1 (N≧1, M≧1).

Each first input is intended to be coupled to an input port of the switching device D and therefore to an input optical line FEi.

Each broadcast module MDi is responsible for switching multiplexed optical channels that it receives at its input (coupled to an input optical line FEi) as a function of their respective wavelengths to one or more of its M first outputs. In other words, a broadcasting module MDi provides an "internal routing" function enabling it to deliver to each of its M first outputs one or more (or even all) optical channels of a multiplex that it has received at its single input.

In the examples shown in FIGS. 1 and 2, each broadcasting module MDi has a first drop output that is coupled to a drop port (or output) of a drop module of one or more channels R1 or R2 of the node NC. The drop modules R1 and R2 could instead form part of the switching device D. Moreover, FIGS. 1 and 2 show two separate drop modules, but they could be combined into a single module. This first drop output recovers at the node NC the signals that are contained in one or more channels transported by any of the input lines FEi, for local processing and/or transmission to at least one terminal connected to the node NC.

In the first example shown in FIG. 1, the broadcasting modules MDi are of the non-selective type. They are optical couplers (or "optical splitters"), for example, responsible for delivering to each of their first outputs all of the optical channels received at their first input.

The broadcasting modules could instead be of the selective type. This is the case in particular of the second embodiment shown in FIG. 2. In this case, they constitute WSS type wavelength selection modules (MD'i), like those described in the introduction. These wavelength selection modules MD'i are adjustable as a function of a control input and can deliver to each of their M first outputs either an optical channel selected from the optical channels received at their first input or a multiplex consisting of a set of optical channels selected from the optical channels of the multiplex received at their first input, as a function of a specific control input. It is important to note that each channel received at the first input can be distributed only to a single first output. Channel selection is effected internally by means of integrated filters.

WSS modules are described in particular in the paper by T. Ducellier et al. "The MWS 1×4: A High Performance Wavelength Switching Building Block", ECOC'2002 conference, Copenhagen, 9 Sep. 2002, 2.3.1.

The WSS type wavelength selection modules are advantageous because, among other things, they induce low insertion losses compared to those induced by simple couplers if their number (M) of outputs is greater than 4.

The second stage E2 (shown in FIGS. 1 and 2) includes M merging modules MFj each having N second inputs and at least one second output that is coupled to one of the M output ports of the switching device D and thus to one of the M output optical lines FSj.

Each merging module MFj provides an internal routing function (where appropriate programmable) for supplying at one or more second outputs either an optical channel selected from the optical channels received at its N second inputs or a multiplex consisting of a set of optical channels selected from the optical channels received at its N second inputs.

In the examples shown in FIGS. 1 and 2, each merging module MFj has a second add input that is coupled to an add module of one or more channels T1 or T2 of the node NC. The insertion modules T1 and T2 could instead be part of the switching device D. Moreover, FIGS. 1 and 2 show two separate add modules, but they could be grouped into a single module. This second add input enables the merging module MFj concerned to be fed with one or more channels in order to multiplex it or them, where appropriate, with other channels received by at least one of its other second inputs.

In the examples shown in FIGS. 1 and 2, the merging modules MFj are of the selective type. They are WSS type wavelength selection modules, for example, such as those described hereinabove and in the introduction. In this case, they are adjustable as a function of a control input and can deliver at their single second output either an optical channel selected from the optical channels received at their N second inputs or a multiplex consisting of a set of optical channels selected from the optical channels received at their N second inputs, as a function of a specific control input.

However, they could instead be of the non-selective type. In this case they constitute optical couplers, for example, responsible for delivering at one or more second outputs a multiplex consisting of all the optical channels received at their N second inputs.

Generally speaking, the merging modules can be of the non-selective type or selective type and the broadcasting modules can be of the non-selective or selective type.

The third stage E3 (shown in FIGS. 1 and 2) includes at least NXM optical links L each coupling one of the M first outputs of one of the N broadcasting modules MDi (or MD'i) to one of the N second inputs of one of the M merging modules MFj. As shown in FIGS. 1 and 2, the third stage E3 can also include optical links L coupling either one of the first outputs of one of the N broadcasting modules MDi (or MD'i) to a drop port (or output) of one of the drop modules T1, T2 or one of the add modules R1, R2 to the second (add) input of at least one of the M merging modules MFj.

It is important to note that a broadcasting module MDi (or MD'i) can have a plurality of first drop outputs, in the same way as a merging module MFj can have a plurality of second add inputs.

A first embodiment of a switching module MC has been described hereinabove (with reference to FIG. 1) in which the broadcasting modules MDi are all optical couplers (optical splitters) and the merging modules MFj are all wavelength selection modules (for example of the WSS type) and a second embodiment of a switching module MC has been described (with reference to FIG. 2) in which the broadcasting modules MD'i and the merging modules MFj are all wavelength selection modules (for example of the WSS type). However, at least one third embodiment can equally be envisaged in which the broadcasting modules are all wavelength selection modules (for example of the WSS type) and the merging modules are all optical couplers.

The invention is not limited to the examples of switching nodes described hereinabove, in particular with reference to FIGS. 1 and 2. Thus another embodiment of the switching module MC can include a first stage E1 arranged in the form of one or more demultiplexers (where appropriate adapted to drop channels), a second stage E2 arranged in the form of one or more multiplexers (where appropriate adapted to add channels), and a third stage E3 arranged in the form of a switching matrix connecting the first outputs of the demultiplexer(s) to the second inputs of the multiplexer(s).

The switching device D also includes processing means MTi at each of the input ports of its switching node NC adapted to add to each channel (or to each of the channels of a multiplex) reaching each input (and/or add) port a signature representing at least the switching node NC in which they are installed.

Accordingly, each channel that takes an optical connection path has added to it in each node NC that it "crosses" (or which adds it to the traffic) a signature including first information representing that node NC. In other words, each channel carries a trace of its passage through each node of the optical connection path that it takes. It is then possible, as explained hereinafter, either to determine in each node each signature added to each channel, in order to reconstitute the path that it has taken (local analysis mode), or to determine in the "last" node of an optical connection path taken by a channel each signature added to it by each node of that optical connection path.

Any type of signature that can represent a node NC can be added to a channel by the processing means MTi of that node NC, provided that it does not entail any optical/electrical/optical conversion.

Remember that here "signature" means any modification applied to a channel or a multiplex for marking the passage at a given location of that channel or of the channels that constitute that multiplex.

The processing modules MTi are preferably adapted to apply a signature to all the channels of a multiplex simultaneously.

For example, the processing means MTi of a node NC can apply to each channel received by each input port the same overmodulation at the frequency $f_{NC}$ representing their node NC and forming first information. In this case, each node of the network must have its own overmodulation frequency (also called its "pilot tone").

It is preferable for each overmodulation frequency to satisfy at least two rules.

Firstly, each overmodulation frequency must be sufficiently high to be transparent to the amplifiers installed on the optical lines FEi and FSj of the network. This is more particularly the case when the amplifiers are of the EDFA (Erbium Doped Fiber Amplifier) type. This type of amplifier smoothes the signal that it amplifies if the modulation frequencies are below a first threshold. Consequently, to retain the overmodulation on passing through an EDFA, its overmodulation frequency must be above the first threshold. It is typically preferable for each overmodulation frequency to be higher than around 10 kHz.

Each overmodulation frequency must then be sufficiently low to be outside the spectrum of the data represented by the signals in the channels. If an overmodulation frequency exceeds a second threshold, this can interfere with the signal because it may correspond to frequencies representing a series of a large number of identical bits (0 or 1). Consequently, if a signal is not to be interfered with the overmodulation frequency must be below the second threshold. It is typically preferable for each overmodulation frequency to be less than around 1 MHz.

It is important to note that the signature that is added to each channel by the processing means MTi of a node NC can represent not only that node NC but also the input port that receive the channel. Any type of second information that can represent an input port of a node NC (and distinguish it from the other ports of that node NC) can be added to a channel in addition to the first information by the processing means MTi of that node NC provided that it does not entail any optical/electrical/optical conversion.

For example, the processing means MTi of a node NC can apply to the first information added to each channel received by an input port second information representing that input port.

For example, this second information can take the form of a phase-shift in the overmodulation applied by way of first information. In this case, the phases of the first information added to the channels received at different input ports differ from each other. In the example shown in FIGS. 1 and 2, for example, the processing means MTi can apply no phase-shift at the first input port coupled to the first input fiber FE1, a phase-shift of $\pi$ at the second input port coupled at the second input fiber FE2, a phase-shift of $-\pi/2$ at the third input port coupled to the third input fiber FE3, and a phase-shift of $+\pi/2$ at the fourth input port coupled to the fourth input fiber FE4.

The combination of overmodulation at a frequency $f_{NC}$ (representing a given node NC) and, for example, a phase-shift (representing one of the N input ports of a node NC) forms a signature indicating unambiguously through which input port of a node a channel has passed. Given this combination, it is not necessary to provide second information (for example different phase-shifts) for input ports of different nodes. The same multiplet of N different second information (for example N phase-shifts) can therefore be used at each node (if these nodes all have the same number of input ports, of course).

This embodiment may necessitate the definition within the network of references of local portions of signatures useful for determining the input port at a given node NC.

Instead of applying to the channels reaching a given input port second information in the form of a chosen phase-shift applied to the first information, there may for example be applied thereto information identifying the port in the form of overmodulation at a frequency specific to that input port or a combination of bits specific to that input port. In other words, in a first variant, a node NC is assigned a batch of overmodulation frequencies uniquely associated with that node, a respective frequency from the batch being assigned to each input port of the node. In a second variant, the overmodulation applied at the input ports of a node has a particular frequency assigned to that node and additionally carries a respective binary code for distinguishing the input ports. This code can be applied by modulating the overmodulation frequency around the frequency assigned to the node.

For adding each signature at each input port, the processing means MTi can, for example, take a modular form, as shown in FIGS. 1 and 2. In this case, each input port has a processing module MTi responsible for adding to the channels that it receives a signature representing the node NC that it equips.

For example, each processing module MTi can be an electrically controlled variable optical attenuator (VOA). In this case, first information (or example overmodulation) is applied to a channel by attenuating its power according to the frequency associated with the node NC including the input port that received it. A processing module MTi of this kind (VOA) can also apply second information, for example in the form of a chosen phase-shift, to each first information, to distinguish this input port from the other input ports of the same node NC.

Types of processing module MTi other than a VOA can be used to add a signature to the channels. Modulators or acoustic-optical modules can be used, for example.

As shown in FIGS. 1 and 2, and as mentioned hereinabove, a switching node NC can also include analysis means MAi coupled to at least some of the output channels of its switching device D, in order to determine at least the signature that has been added to each channel received by the processing means MTi installed in the input ports of the same switching device D.

As shown, each output port is preferably analyzed by the analysis means. However, it can equally be envisaged that the analysis means analyze the drop ports. In particular this enables an end-to-end analysis in the last node of a network. It can equally be envisaged that the analysis means analyze only the drop ports.

The analysis means MAi are preferably capable of determining each signature that has been added to each channel by the processing means MTi of each switching node through which that channel has passed, including their own. This is necessary in particular if only the drop ports that include a switching device D are analyzed by the analysis means MAi, which is the case in a ring network, for example.

The analysis means can be of the modular type or the pooled type.

In the pooled analysis means case, a single analysis module analyzes the signatures added to the channels delivered by a plurality of outputs (output ports and/or drop ports). In this case, each output port to be analyzed is provided with an optical Y-splitter coupled, on the one hand, to the corresponding output fiber FSj and, on the other hand, to one of the inputs of a switch responsible for selecting one of the output ports to be analyzed and for delivering at an output the channels received by that output port to be analyzed to feed the input of the pooled analysis module.

In the modular analysis means case, each output to be analyzed is equipped with its own analysis module. This is the case in particular of the output ports in the examples shown in FIGS. 1 and 2. More precisely, to determine at each output each signature added to each channel, that output is provided with an optical Y-splitter coupled, on the one hand, to the corresponding output fiber FSj and, on the other hand, to the corresponding analysis module MAi, and responsible for sampling a small portion of the power of the channels delivered by this output port to feed the analysis module MAi. The optical Y-splitter is of the 95%/5% type, for example.

The method for determining a signature added to a channel depends on the type(s) of technique used to generate and add the signature. Regardless of the method used, the analysis module MAi must first spectrally separate (or filter) the channels to be analyzed, which are delivered in the form of a multiplex by an output (here an output port), by means of an optical filtering sub-module. This analysis module MAi must then convert the channel into an electrical signal by means of an optical/electrical conversion sub-module whose bandwidth is preferably appropriate to the frequencies contained in the signatures. This analysis module MAi must then analyze this electrical signal, by means of an electrical analysis sub-module, in order to identify the signatures, i.e. firstly, where applicable, the overmodulation frequency or frequencies constituting the first information and, secondly, identify the phase (or the overmodulation) constituting the second information specific to the node (or the second information for the preceding nodes).

The optical filtering sub-module may be provided by means of a tunable filter, for example.

The optical/electrical conversion sub-module can for example take the form of a photodiode at the output of the optical filtering sub-module responsible for converting the optical channels into electrical signals.

The optical filtering and optical/electrical conversion sub-modules can be grouped in a single optical channel monitor (OCM) module that can be produced either by cascading a tunable filter and a photodiode or in the form of a diffraction grating splitting the wavelengths toward a strip of photodiodes.

The electrical analysis sub-module can for example take the form of a synchronous detection ("lock-in detection") sub-module responsible for determining the overmodulation frequency of the electrical signals and where applicable the phase-shift of that overmodulation.

The implementation of the electrical analysis sub-modules varies as a function of the nature of the first and second information, of course.

Thanks to this type of analysis of the channels, it is possible to determine at a node NC each signature added to each channel, and thus to determine at least each node through which it has passed (if the overmodulation frequency associated with each node is known), and where applicable each input port used in each transit node. Knowing the input ports that received the channels, it is possible to deduce the output ports of the nodes through which they have passed in transit and that are coupled to these input nodes. The path taken previously by each channel can therefore be reconstituted at each analysis location.

It will be noted that at least certain of the channel add ports (outputs of the add modules T1 and T2) can be provided with an additional processing module MTi of the type described hereinabove. If they are not provided with any processing module MTi, the channels that are added in a given node do not have any signature when they reach an output port of that node. This absence of signatures on channels nevertheless constitutes a signature valid locally since it indicates that they were added in the current node.

Moreover, if the management plane reports to the nodes the channels that should reach each of their input ports and the channels that should be delivered to each of their output ports, the analysis means MAi can verify whether the physical state of their switching device D actually correspond to its logical state. If there is no match (or in the event of unsuitability), the analysis means MAi deduce from this that there is a problem and can, for example, generate an alarm message in order to execute a protection mechanism intended to solve the problem that has been detected.

The switching node equipped with the processing and analysis modules tracks optical connection paths set up in a transparent optical network, in particular in a local analysis mode (i.e. by means of analyses effected in the switching node of the network), and also in an end-to-end analysis mode if the signatures are applied cumulatively at various points of the network.

FIG. 3 shows part of a transparent wavelength division multiplex optical network 30 designed to implement different wavelength channel routing surveillance methods. The network 30 formed from a plurality of switching nodes each of which is adapted to mark with a respective node signature the optical signals that it switches between its input ports and output ports. Here the network 30 includes an optical cross-connect 31 and a reconfigurable optical add/drop multiplexer (ROADM) 32 connected by optical fibers 33 forming a ring 34. The optical cross-connect 31, produced in a similar way to FIG. 1 or 2, for example, connects the ring 34 to another network portion 38 part of which has been sketched in. The topology represented is purely illustrative. The surveillance devices described hereinafter can be installed in networks of any size and with any topology.

One or more switching nodes of the network, here the nodes 31 and 32, are equipped with optical connection path surveillance devices for detecting routing errors. FIG. 3 shows connections 35 and 36 between each of the nodes 31 and 32 and a centralized network management unit 37. These connections are used to transmit alarm signals to the management device 37 if a surveillance device of a node detects a routing error affecting an optical signal. Other nodes of the network can be connected to the management device 37 in a similar way.

FIG. 4 shows one embodiment of the ROADM 32 equipped with surveillance devices for detecting looped path type errors and stray path type errors. Broadly speaking, the ROADM 32 has an input port 41 connected to an upstream optical fiber, an output port 42 connected to a downstream optical fiber, and a transparent switching matrix 43 between the ports 41 and 42. The switching matrix 43 has one or more add ports 44 in order to be able to add one or more wavelength channels and one or more drop ports 45 in order to be able to drop one or more wavelength channels. As in the optical cross-connects from FIGS. 1 and 2, there are provided a processing module 46 at the input port of the switching matrix 43 for applying amplitude overmodulation to the incoming optical signals and a processing module 47 in the add port 44 for applying amplitude overmodulation to the added optical signals. The overmodulation is applied at one or more frequencies assigned uniquely to the ROADM 32, in order to be able to distinguish anywhere in the network the optical signals that have passed through the ROADM 32. The frequency value(s) to be applied by the processing modules 46 and 47, which here constitute the signature of the ROADM 32, are stored in a memory 48, for example, which the processing modules can access, as shown by the connections 49. Access to the memory 48 is preferably also provided from the management device 37 to enable configuration or updating of the frequencies or other characteristics of the signatures from the management device 37. Instead of this, or in conjunction with this, there can be provision for carrying out these operations from a local man-machine interface of the node 32.

There is described next in more detail a surveillance device responsible for detecting looped connection paths in the ROADM 32. To this end, an analysis module 50 is coupled to the optical line in which the ROADM 32 receives the optical signal coming from the upstream optical fiber. The operation of the device is shown in FIG. 6. In the step 61, the analysis module 50 analyzes the wavelength division multiplexed optical signal or the signals of the separate channels, one by one, in order to determine the node signature(s) that it is carrying. The detected signature(s) are communicated to a search unit 55. In the step 62, the search unit 55 compares the detected signature(s) to the signature(s) uniquely assigned to the ROADM 32, in order to determine if the analyzed optical signal, which can be a multiplex or a separate channel, is already carrying a signature of the ROADM 32 at the input port 41. If this is the case, in the step 63, the search unit 55 detects a looped path for that optical signal. Looped paths generally to be avoided in a network. A looped path can be the result of a failure in the control plane, for example a programming error, or in the data plane of the network, for example a malfunction of a switching component. The search unit 55 can then initiate one or more of the following corrective actions:

an alarm unit 56 sending an alarm signal to the management device 37,
   a control unit 57 switching the switching matrix 43, to terminate or extract the optical signal.

To this end the analysis module 50 can conform to the FIG. 5 embodiment, in which the analysis module includes a coupler 65 adapted to sample a portion, for example 5%, of the incoming optical signal, an optical filtering sub-module 66, which is preferably tunable, for selecting a wavelength channel of this optical signal, an optical/electronic conversion sub-module 67 for converting the selected channel into an electrical signal, a filter and amplifier sub-module 68 for shaping the electrical signal in which the node signatures must be detected, and a spectral analysis sub-module 69 for determining the overmodulation frequency or frequencies present on the converted channel. The spectral analysis sub-module 69 can be produced using a digital signal processor. For example, the result of the processing effected by the analysis module 50 can take the form of an overmodulation spectrum 70 giving the frequency values f for which overmodulation is present, and where appropriate a measurement of the power at each frequency.

In one embodiment, the optical filtering sub-module 66 is designed to select a multiplex of wavelengths within the optical signal, for example a band of wavelengths or a set of wavelengths belonging to the same connection.

In another embodiment, the optical filtering sub-module 66 is eliminated, with the result that overmodulation is detected over the whole of the spectral multiplex. The signatures can be obtained fairly quickly in this way, with the result that looped path detection can be faster than if the surveillance were to be effected successively, channel by channel, with the optical filtering sub-module adjusted each time. However, if the analysis of a multiplex leads to the detection of a looped path, it may be necessary to obtain more precise information in order to locate the source of the problem. To this end it may be desirable, after analysis of the multiplex, to proceed to a channel by channel analysis to identify the channel that takes a looped path and to transmit the identity of that channel to the network management device 37. Two separate analysis modules may be provided to conduct these two analyses, or one analysis module in which the optical filtering sub-module 66 is selectively rendered transparent or selectively bypassed. The latter optioned is sketched in FIG. 5, in which an optical link 78 connects the coupler 65 to the conversion sub-module 67, bypassing the filtering module 66, and a switch 79 selectively forwards the optical signal coming from the coupler 65 to the sub-module 66 or to the link 78.

Alternatively, loop detection can be effected with the aid of an analysis module disposed downstream of the switching matrix 43, i.e. for optical signals leaving the ROADM 32. In this case, the processing module 46 applying the corresponding signatures must always be on the downstream side of the analysis module.

The search unit 55 can access the memory 48 to search for the signatures of the node. The signatures searched for can include signatures used to mark the optical signals that the ROADM 32 adds and/or signatures that mark the optical signals passing in transit through the ROADM 32.

If a channel is sent only by a particular node, a signature associated with that channel can also be treated as a signature of the corresponding node. In a node sending a wavelength channel marked by a particular channel signature, the surveillance device can therefore also effect loop detection on the basis of the detection of that channel signature.

There is described next in more detail a surveillance device responsible for detecting in the ROADM 32 possible stray connection paths in the network. To this end, an analysis module 80 is coupled to the optical line in which the ROADM 32 transmits the optical signal to the downstream optical fiber. The operation of the device is shown in FIG. 7. In the step 71, the analysis module 80 analyzes the wavelength division multiplexed optical signal or the signals of the separate channels, one by one, in order to determine the node signature(s) that it is carrying. The analysis of a multiplex is pertinent if that multiplex takes a single route in the network. The analysis module 80 can be identical to the analysis module 50. The detected signature(s) are communicated to a calculation unit 81. In the step 72, the calculation unit 81 counts the number of hops represented by the detected node signatures.

How this counting is effected depends on how the signatures are applied by the nodes of the network. In the case of a network in which each node applies overmodulation at a different frequency, it suffices to count the number of overmodulation frequencies present in the signal. If each node signature consists in a fixed number of frequencies, it suffices to count the number of overmodulation frequencies present in the signal and to divide the total by that fixed number. In more complex situations, for example if not all of the nodes apply a similar signature scheme, the calculation unit 81 can cooperate with a signature directory 82 stored in a memory or other storage medium. The signature directory 82 contains a record of each signature of each node of the network, for example, which enables the calculation unit 81 to compare the detected signatures to these records to identify and count the various node signatures.

In the step 73, the calculation unit 81 compares the number of hops represented by the signatures to a predetermined higher threshold. This higher threshold is fixed when configuring the surveillance device, for example, and stored in the calculation unit 81.

The higher threshold can be fixed as a function of the topology of the network. For example, it is possible to determine a maximum number of hops for connecting any two nodes of a network with Q nodes. One possible procedure for this consists in:
  calculating the shortest path, in terms of the number of hops, for each of the Q*(Q−1) point-to-point connections between two nodes,
  identifying the maximum number of hops for all these paths.

The higher threshold can be made equal to this maximum number, where appropriate increased by a positive safety margin.

Paths for which the number of hops exceeds this maximum number are generally to be avoided in the network and can therefore be considered to be stray paths. A stray path can be the result of a failure in the control plane of the network, for example a programming error or a routing decision that is incoherent with a reconfiguration in progress in the network, or a failure in the data plane of the network, for example a malfunction of a switching component, or a human error.

In the step 74, if the maximum number is exceeded, the calculation unit 81 detects a stray path for that optical signal. The calculation unit 81 can then initiate one or more of the following corrective actions:
  step 75: an alarm unit 56 sending an alarm signal to the management device 37,
  step 76: a control unit 57 switching the switching matrix 43 in order to terminate or extract the optical signal.

The detection of an excessive number of hops can instead be effected with the aid of an analysis module disposed on the upstream side of the switching matrix 43, i.e. for optical signals entering the ROADM 32. However, an analysis at the output ports is preferable in that it avoids unnecessarily checking channels to be extracted. The surveillance device can also be installed separately of any switching node.

Detecting the number of hops or determining an end-to-end connection path from node signatures accumulated on the optical signal presupposes that the signatures of the various nodes can be accumulated in a way that preserves the detectability of each node signature. To favor this detectability, it is possible to choose the node signatures in a set of judiciously chosen values. For example a set of frequency values reducing four-wave mixing can be constructed in accordance with the principles set out by F. Foghieri et al. in "Reduction of Four-Wave Mixing Crosstalk in WDM Systems Using Unequally Spaced Channels" IEEE Photonics Technology Letters, Vol. 6, pp. 754-756 (1994).

To improve signature detection, it can also be advantageous to provide a spectrum equalizer on the upstream side of the analysis module for equalizing the power in the wavelength channels. The amplitude overmodulation is preferably applied with a substantially uniform modulation depth throughout the network, chosen to be equal to 1 to 5%, for example. Thus equalization of the wavelength channels can conjointly produce equalization of the signatures, in order to facilitate counting the channels carrying a given signature as a function of the power at that overmodulation frequency.

The manner of producing the surveillance devices in another type of optical switching node, for example in the optical cross-connect 31, is readily deduced from the example given with reference to the ROADM 32. For example, a respective analysis module can be assigned to each port or a pooled analysis module can be employed for a plurality of ports, as described with reference to FIGS. 1 and 2.

Looped connection path surveillance and stray connection path surveillance produce mutually complementary results and are therefore preferably implemented conjointly. Certain modules of components of the two surveillance devices can thus be pooled or integrated, for example an analysis module, an alarm unit or a programmable circuit. However, each surveillance device can also be installed independently of the other device. In contrast to other fault detection systems, these two surveillance devices use relatively stable reference information, namely the maximum number of hops across the network and the signature(s) assigned to the node. Updating of this reference data by the control plane of the network should therefore be necessary only rarely.

Loop detection can be implemented in accordance with the same principles with signatures associated with transit points other than switching nodes.

There is described next with reference to FIG. 8 one embodiment of a transparent switching node equipped with an enhanced routing surveillance device, enabling detection of an event affecting the routing of the wavelength channels even before an analysis of the signatures of each channel can be effected. This switching node is intended to be installed in a transparent optical network formed of one or more elements each having the capacity to mark with a respective signature the optical signal that it causes to pass in transit through the network. These elements can be switching nodes with which node signatures are associated, as in the network shown in FIG. 3, for example.

For the purposes of illustration, there is shown here a switching node 90 having two input ports 84, 85 and two output ports 86, 87 interconnected by a transparent switching matrix 88 provided with one or more add ports 91 and one or more drop ports 92. For example, there is described hereinafter the surveillance device installed in the node 90 in order to analyze signatures at the output of the switching matrix 88 associated with the port 86. This surveillance device includes a first analysis module 93 that samples a fraction of the multiplex of wavelengths in transit at the output, without filtering the wavelength channels, and which detects all node signatures carried by that optical signal. The analysis module 93 can be similar to that from FIG. 5, but without the optical filtering module 66.

At regular intervals, the analysis module 93 sends a temporal comparison module 94 the spectrum of the detected signatures, for example for the whole of the range of overmodulation frequencies used in the network or for a continuous or discontinuous subset of that range, for example including all the overmodulation frequencies used by the node 90, all the overmodulation frequencies used by the nodes of a particular sector of the network, all the overmodulation frequencies used by the nodes directly downstream of the node 90, or all the overmodulation frequencies used by the nodes adjacent the node 90. The temporal comparison module 94 detects the temporal variations of the detected signals by comparing the spectrum received at the time increment t with the spectrum received one time increment before. To this end, the temporal comparison module 94 holds in a memory 95 a record of the spectrum of the signatures detected at one or more past times, for example with the time increment t-1. If it detects a variation of this spectrum, the temporal comparison module 94 advises the node controller 96 of it.

FIGS. 9 and 10 show by way of example a solution bringing about a variation of the signatures at the output. At a time t, the gate 86 receives via the switching matrix 88 two channels marked by overmodulation at the frequency f1 from the port 84, namely λ1 and λ3, and two channels marked by overmodulation at the frequency f2 from the port 85, namely λ2 and λ4. FIG. 9 shows the corresponding signature spectrum measured by the analysis module 93. At a subsequent time, the channel λ4 no longer reaches the port 86. FIG. 10 shows the corresponding signature spectrum measured by the analysis module 93. As soon as the temporal comparison module 94 receives the FIG. 10 spectrum, it detects that a variation has occurred with respect to the signature at the frequency f2, for example by calculating a difference between the two spectra and comparing the result to a predefined threshold. A warning of this can be given to the node controller 96 very quickly.

The signatures at the frequencies f1 and f2 can be applied in a preceding node, for example, or in the node 90, for example with the aid of processing modules disposed in a similar way to the FIGS. 1 and 2 embodiments. Note that a variation of the signature spectrum would also be detected in the situation described hereinabove if, instead of the two different frequencies f1 and f2, the signatures carried by the optical signals at the two input ports 84 and 85 had the same frequency with a different phase-shift for each port. The intensity detected at this frequency would also be subject to variation in this case.

The surveillance device also includes a second analysis module 98 that detects the respective node signatures carried by each wavelength channel of the optical signal in transit at the output. The analysis module 98 can be similar to that from FIG. 5 or, as indicated with reference to FIG. 1, in the form of an OCM. In another embodiment, the two analysis modules 93 and 98 can share certain components, as in the FIG. 5 variant described hereinabove.

The analysis module 98 is preferably triggered by the node controller 96 in response to the detection of a spectrum variation by the comparison module 94. The operation of the analysis module 98 is similar to that of the modules MA from FIGS. 1 and 2. The optical signal is analyzed channel by channel in order to determine the signature(s) that it carries. To this end the optical filtering module is successively tuned to each wavelength channel or, in the case of an OCM, the electrical signal from each photodiode is selected successively, for example by means of an electronic switch, in order to detect the successive signatures corresponding to each channel separated by the broadcasting network. In the case of a pooled analysis module 98, the corresponding switch can be commanded to select the channel for which the analysis module 93 has detected a signature variation.

The detected signature spectrum for each channel is passed to the node controller 96 in order to be compared to the programming state of the optical connection paths. This comparison can take place locally in the node controller 96 or in a centralized manner in a network management device following transmission of the measurements from the node controller 96. Here the programming state of the optical connection paths refers to reference information defining which wavelength channels must be present at each output port of the switching node 90 and the source of those channels. Accordingly, by comparing this reference information with the identity of the channels detected at the output and the signatures carried by each channel, inconsistencies can be detected that reflect a network configuration error, for example the presence of an unintended channel, the absence of an intended channel, the presence of an intended channel with an unintended source, etc. The channel by channel analysis produced by the analysis module 98 can take much longer than the global analysis produced by the analysis module 93. If a precocious alarm is sent to the network manager, this delay is not critical because the analysis module 98 is used primarily to specify or confirm the nature of the problem detected.

For example, as a precautionary measure, an optical protection path bypassing the switching matrix 88 could be activated immediately the warning is given by the comparison module 94 by activating a backup switching matrix (not shown) of the node 90.

Alternatively, the analysis module 98 can operate continuously in parallel with the analysis module 93, without necessitating specific triggering. However, this embodiment increases the energy consumption of the surveillance device, and therefore the heat dissipation, and, where applicable, aging of the tunable filter.

As indicated by the arrow 97, the node controller 96 is connected by control channels to a network management device and/or to the node controllers of other nodes of the network, in order to receive control messages that include, for example, command instructions for locally reconfiguring the switching matrix 88, for example for setting up optical paths, destroying optical paths or modifying existing optical paths. Reciprocally, the node controller 96 has a signaling module 97 for sending control messages.

In one particular embodiment, the node controller 96 that has received the warning from the comparison module 94 determines if the detected signature variation corresponds to a command instruction that has just been executed. If so, the detected variation can be treated as confirmation of correct execution of the command instruction and, for example, lead to the sending of a confirmation message to a network management device. (In the example of FIGS. 9 and 10, this situation corresponds for example to executing an instruction to reconfigure the switching matrix 88, causing the elimination of the channel λ4 at the port 86). It is not necessary to trigger the analysis module 98 in this case, unless a channel by channel analysis is necessary in order to be able to confirm execution of the reconfiguration instruction. Conversely, if this is not so, the detected variation can be treated as a precocious error indication and, for example, lead to the sending of an alarm message to a network management device and to triggering a detailed analysis by the analysis module 98.

In order to be able to distinguish signature variations caused by the operation of the switching matrix 88 from signature variations caused by variation of optical signals received by the input ports 84 and 85, it may be advantageous to add another multichannel signature variation detector, similar to the modules 93 and 94, between the input ports and the switching matrix.

Furthermore, although the surveillance device has been described and shown in relation to an output of the node, this device can be installed in the same way at any input or any output of the node.

Regardless of the type of surveillance effected, another embodiment consists in using a switch having selectable inputs respectively coupled to one or more outputs and to one or more inputs of the switching matrix and a pooled analysis module having an input coupled to the output of the switch and responsible for analyzing an optical signal coming selectively from one of the channels coupled to the switch.

The various surveillance devices described can be installed independently of each other or in a combined manner. In the latter case, certain modules or components of the different surveillance devices can be pooled or integrated, for example an analysis module.

The use of the verb "comprise" or "include" and its conjugate forms does not exclude the presence of elements or steps other than those stated in a claim. Unless otherwise indicated, the use of the indefinite article "a" or "an" for an element or a step does not exclude the presence of a plurality of such elements or steps.

The invention can be implemented by computer programs specifically designed for the stated functions to be executed by programmable hardware or elements whose hardware design specifically corresponds to the stated functions, or by a combination of programs and specific hardware elements. The same hardware element can represent a plurality of means or units or modules.

In the claims, any reference numbers in parentheses should not be interpreted as limiting the claim.

Although the invention has been described in relation to a plurality of particular embodiments, it is clear that it is not limited to them and that it encompasses all technical equivalents of the means described together with combinations thereof if the latter are within the scope of the invention.

The invention claimed is:

1. Optical connection path surveillance method, for a transparent optical network (30) in which each of a plurality of switching nodes (31, 32) is respectively adapted to pass an optical signal transparently from a link on the upstream side of said switching node to a link on the downstream side of said switching node and to mark said optical signal with a node signature including information uniquely associated with said switching node, said method including the step of detecting (71) the node signatures with which an optical signal in transit at a point of said network is marked, characterized by the steps of:
   determining (72) a number of hops from said detected node signatures,
   comparing (73) said number of hops to a predetermined threshold in order to detect a routing error relating to said optical signal if said threshold is exceeded.

2. Method according to claim 1, characterized in that the signatures carried by an optical signal received by a switching node (32) of said network are detected.

3. Method according to claim 1, characterized by the step of terminating or extracting from the network said optical signal for which said routing error is detected.

4. Method according to claim 1, characterized in that the signatures carried by an optical signal having a single wavelength are detected.

5. Optical connection path surveillance device for a transparent optical network, including:
   analysis means (80, 81) adapted to detect node signatures carried by an optical signal in transit at a point of said network, each node signature including information uniquely associated with a switching node of said network,
   characterized by the fact that said analysis means include calculation means (81) adapted to determine a number of hops from said detected node signatures and error detection means (81) adapted to compare said number of hops to a predetermined threshold, in order to detect a routing error relating to said optical signal if said threshold is exceeded.

6. Device according to claim 5, characterized in that said calculation means determine the number of hops as a number of different node signatures detected.

7. Device according to claim 5, characterized in that it includes a signature directory (82) identifying a plurality of node signatures and the respective switching node associated with each of them, said calculation means being adapted to cooperate with said signature directory to determine said number of hops.

8. Device according to claim 5, characterized in that said analysis means include an optical filtering module (66) for separating one or more channels from a multiplex of wavelengths in transit in the network and for supplying said one or more wavelength channels as an optical signal the signatures whereof must be detected.

9. Device according to claim 5, characterized by the fact that it includes alarm means (56) adapted to produce an alarm signal in relation to said optical signal for which said routing error is detected.

10. Device according to claim 5, characterized by the fact that it is associated with a switching node (32) in which said optical signal is received, said routing error detection device including control means (57) adapted to command a switching device (43) of said switching node to terminate or extract said optical signal for which said routing error is detected.

11. Optical connection path surveillance device for a switching node (32) of a transparent optical network, said switching node including processing means (46, 47) adapted to mark an optical signal with at least one node signature including information uniquely associated with said switching node, at least one optical output (42) adapted to transmit said marked optical signal into said network, at least one optical input (41) adapted to be coupled to an optical line of the network (33), and switching means (43) coupling at least one of said inputs to at least one of said outputs, said surveillance device including analysis means adapted to analyze an optical signal received by said switching node on the upstream side of said processing means in order to detect one or more signatures with which said optical signal is marked, characterized by the fact that:
   said analysis means (50, 55) are adapted to search for said at least one node signature associated with said switching node in order to detect a routing error if said received optical signal is marked by a node signature associated with said switching node on the upstream side of said processing means.

12. Device according to claim 11, characterized in that said analysis means are adapted to search for said at least one node signature in an optical signal having only one wavelength.

13. Device according to claim 11, characterized in that said analysis means are adapted to search for said at least one node signature in a multiplex of wavelengths.

14. Device according to claim 11, characterized in that said analysis means include an analysis module (50) adapted to operate selectively in a single-channel mode of operation in which said at least one node signature is searched for in an optical signal having only one wavelength and in a multichannel mode of operation in which said at least one node signature is searched for in a multiplex of wavelengths.

15. Device according to claim 11, characterized in that said analysis means cooperate with storage means (48) for storing the signature or the plurality of signatures associated with the switching node.

16. Device according to claim 11, characterized by the fact that it includes alarm means (56) adapted to produce an alarm signal in relation to said optical signal for which said routing error is detected.

17. Device according to claim 11, characterized by the fact that it is associated with a switching node (32) in which said optical signal is received, said routing error detection device including control means (57) adapted to command a switching device (43) of said switching node to terminate or extract said optical signal for which said routing error is detected.

* * * * *